United States Patent
Hayes et al.

(10) Patent No.: US 10,885,024 B2
(45) Date of Patent: Jan. 5, 2021

(54) MAPPING DATA RESOURCES TO REQUESTED OBJECTIVES

(71) Applicant: Pearson Education, Inc., New York, NY (US)

(72) Inventors: Catherine Hayes, Epsom (GB); Michael John Mayor, London (GB); Joseph John Worachek, Littleton, CO (US); Ian Wood, Linton (GB); Veronica Benigno, Bremen (DE); Simon Piers Buckland, Dorchester (GB)

(73) Assignee: PEARSON EDUCATION, INC., New York, NY (US)

( * ) Notice: Subject to any disclaimer, the term of this patent is extended or adjusted under 35 U.S.C. 154(b) by 597 days.

(21) Appl. No.: 15/343,009

(22) Filed: Nov. 3, 2016

(65) Prior Publication Data
US 2018/0121496 A1 May 3, 2018

(51) Int. Cl.
*G06F 16/242* (2019.01)
*G06F 16/9535* (2019.01)
*G09B 5/00* (2006.01)
*G09B 7/00* (2006.01)
*G06F 40/20* (2020.01)
(Continued)

(52) U.S. Cl.
CPC ...... *G06F 16/2423* (2019.01); *G06F 16/9535* (2019.01); *G06F 40/20* (2020.01); *G06F 40/40* (2020.01); *G09B 5/00* (2013.01); *G09B 7/00* (2013.01); *G06F 3/0484* (2013.01)

(58) Field of Classification Search
CPC ......... G06F 17/30867; G06F 17/30038; G06F 17/30525; G06F 17/30528; G06F 16/9535; G06F 16/951

USPC ..... 705/44, 39, 14.55, 5, 7.32, 14.38, 14.45, 705/14.64, 14.66, 16, 17, 7.14, 7.28; 709/203, 204, 202, 217, 220, 224, 227, 709/231; 707/722, 785, 708, 754, 756, 707/770

See application file for complete search history.

(56) References Cited

U.S. PATENT DOCUMENTS

| 7,146,616 | B2 * | 12/2006 | Dorner | G06F 9/547 |
| | | | | 719/318 |
| 8,175,511 | B1 | 5/2012 | Sordo et al. | |
| 9,680,945 | B1 * | 6/2017 | Treves | H04L 67/22 |

(Continued)

FOREIGN PATENT DOCUMENTS

| WO | 2011122930 | 10/2011 |
| WO | 2014009918 | 1/2014 |

OTHER PUBLICATIONS

Dana V Balas et al., Ability Estimation in CAT with Fuzzy Logic, ISCIII 2009, 4th Int'l Symposium On, IEEE, Piscataway, NJ Oct. 2009, pp. 55-62, XP30152036.

*Primary Examiner* — Ken Hoang
(74) *Attorney, Agent, or Firm* — Quarles & Brady LLP

(57) ABSTRACT

Systems, device configurations, and processes for a server to receive, from a user interface (UI) on a client, a request to generate a list from a selection of: an objective, vocabulary item, and/or grammar point mapped to a range of competency scores, and an audience. The server then selects data records storing data for the objective, vocabulary item or grammar point. The server then renders, for transmission and display on the client, a user interface control including a list of data for the objective, grammar point, and/or vocabulary item.

20 Claims, 6 Drawing Sheets

(51) Int. Cl.
*G06F 40/40* (2020.01)
*G06F 3/0484* (2013.01)

(56) References Cited

U.S. PATENT DOCUMENTS

| | | |
|---|---|---|
| 10,354,544 B1 * | 7/2019 | Chernin .................... G06N 5/04 |
| 2001/0044795 A1 * | 11/2001 | Cohen ............... G06F 17/30699 |
| 2002/0016814 A1 * | 2/2002 | Convent .................. G06F 9/465 |
| | | 709/203 |
| 2002/0091702 A1 * | 7/2002 | Mullins ............. G06F 17/30557 |
| 2003/0017442 A1 | 1/2003 | Tudor et al. |
| 2003/0037034 A1 * | 2/2003 | Daniels ................ G06Q 10/087 |
| 2003/0039948 A1 | 2/2003 | Donahue |
| 2003/0074370 A1 * | 4/2003 | Gargano ............. G06F 17/3089 |
| 2003/0115189 A1 * | 6/2003 | Srinivasa ............. G06F 16/335 |
| 2005/0055357 A1 * | 3/2005 | Campbell .................. G06F 8/61 |
| 2005/0277103 A1 | 12/2005 | Townshend et al. |
| 2007/0231780 A1 | 10/2007 | Shulman |
| 2008/0254430 A1 | 10/2008 | Woolf et al. |
| 2011/0039249 A1 | 2/2011 | Packard et al. |
| 2012/0214147 A1 | 8/2012 | Ernst et al. |
| 2012/0231439 A1 | 9/2012 | Attali |
| 2012/0276505 A1 | 11/2012 | Al Badrashiny et al. |
| 2014/0164507 A1 * | 6/2014 | Tesch ...................... H04L 51/10 |
| | | 709/204 |
| 2014/0295384 A1 * | 10/2014 | Nielson .................. A61B 5/162 |
| | | 434/157 |
| 2014/0335497 A1 | 11/2014 | Gal et al. |
| 2014/0335502 A1 | 11/2014 | Huang et al. |
| 2015/0026184 A1 * | 1/2015 | Ossikine ................ G06F 16/35 |
| | | 707/738 |
| 2015/0037765 A1 | 2/2015 | Jaggi et al. |
| 2015/0325138 A1 | 11/2015 | Selinger |
| 2016/0225278 A1 | 8/2016 | Leddy |
| 2016/0293036 A1 | 10/2016 | Niemi et al. |

* cited by examiner

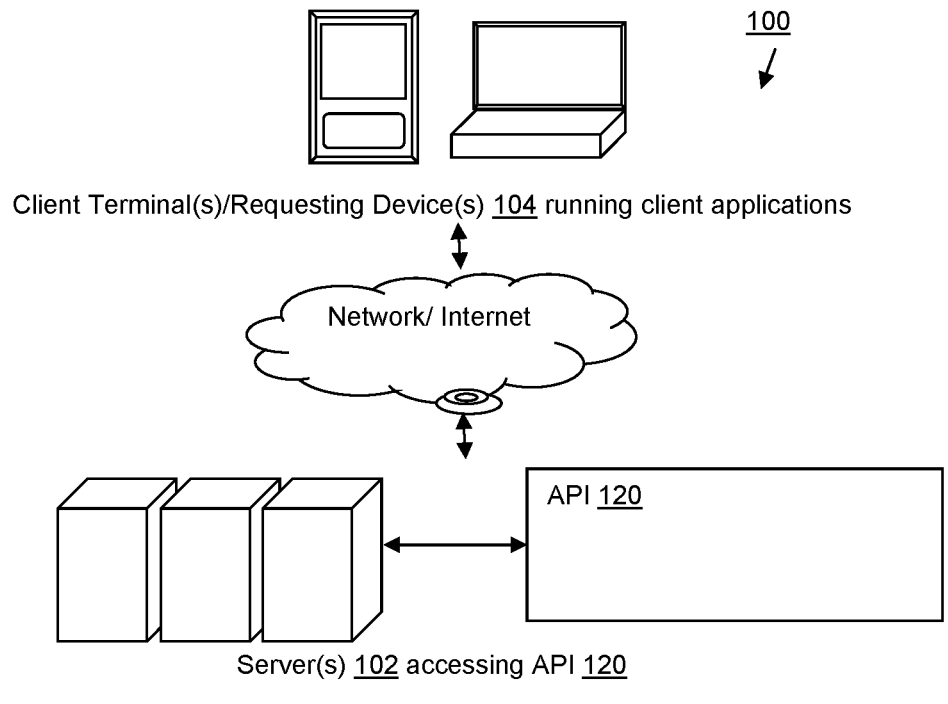
Client Terminal(s)/Requesting Device(s) 104 running client applications
Network/ Internet
API 120
Server(s) 102 accessing API 120
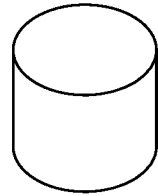
Data Store/Databases 110 storing mapping, language, learning objective, grammar, and vocabulary data
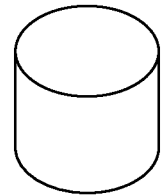
3rd Party Data Stores 112
FIG. 1

| File Edit Tools | ⇐ ⇒ |

Learning Objectives   Vocabulary   Grammar

Who are you teaching?

GSE/CEFR Score
```
<A1    A1    A2    A2+   B1    B1+   B2    B2+   ...
|-----------------------O-----------------------------O---|
10  22   30    36   43    51    59    67    76
```

| Adult Learner ▽ |

| Choose Skill ▽ |   | Search here for a specific word or phrase |

Filters (Hide Filters):   Skills: Reading [X]            | SEARCH |

Search Results: 100

| LEARNING OBJECTIVES | SKILL | GSE | CEFR |

Can understand simple descriptions of people's appearance   Reading   30   A2
Can understand short, simple messages on postcards          Reading   31   A2
Can understand simple questions in questionnaire            Reading   31   A2
Can find specific, predictable information in everyday materials   Reading   31   A2
...

FIG. 4

| File Edit Tools | | | | | | | | | |
|---|---|---|---|---|---|---|---|---|---|

Learning Objectives   Vocabulary   Grammar

Who are you teaching?

GSE/CEFR Score
```
<A1    A1    A2    A2+    B1    B1+    B2    B2+   ...
|-------------------------O--------------------------O---|
10  22   30    36    43    51    59    67    76
```

| Adult Learner ▽ |

| Choose Topic ▽ | | Search here for a specific word or phrase |

| Grammatical Category ▽ | Sub Category | | SEARCH |

Filters (Hide Filters):   Skills: Reading [X]

Search Results: 100

| VOCABULARY | TOPIC | GRAMMAR | GSE | CEFR |
|---|---|---|---|---|
| Ball | Sports, Hobbies, Interests | Noun | 30 | A1(22-29) |
| Ball | Physical Attributes | Noun | 54 | B1+(51-58) |
| Balloon | House, Home, Sports, Hobbies | Noun | 58 | B1+(51-58) |
| Ballot | Media, Arts, Literature | Noun | 61 | B2(59-66) |
| ... | | | | |

FIG. 5

MAPPING DATA RESOURCES TO REQUESTED OBJECTIVES

BACKGROUND

The present invention relates to providing users with data resources for preparing lesson plans, and specifically relates to indexing and mapping learning objectives, grammar learning, and vocabulary resources within a data store to respond to a user search for such resources.

SUMMARY

According to an embodiment of the present invention, a server computer, or any other computing device, may be communicatively coupled to a network. The server computer may include, or be coupled to, a memory. One or more processors may execute one or more software instructions stored within the memory. The software instructions may include method steps for the processes in the disclosed embodiments. For example, the instructions may cause the server computer to: receive, from a user interface (UI) displayed on a client computer coupled to the network: an objective, vocabulary item, or grammar point; a selection of a range of competency scores; an audience for the objective, vocabulary item or grammar point; and a request to generate a list within the selected range and appropriate for the audience, of the objective, the vocabulary item, or the grammar point.

The server may then execute a remote procedure call (RPC), within an application programming interface (API) associated with the client application, mapping the request to a database coupled to the network, and further selecting, from the database, data records storing data for the objective, vocabulary item, or grammar point.

The server computer may then render a UI control for display on the UI, including list items including the requested objective, vocabulary item, or grammar point. The server computer may then transmit the UI control to the client computer for display on the UI.

BRIEF DESCRIPTION OF THE DRAWINGS

The detailed description is set forth with reference to the accompanying drawings. The use of the same reference numbers in different figures indicates similar or identical items or features. Various embodiments in accordance with the present disclosure will be described with reference to the drawings, in which:

FIG. 1 is a diagram of an example system configured to provide mapped and indexed resources to a resource system, in accordance with the present disclosure;

FIG. 4 is a non-limiting example user interface within an example system configured to provide mapped and indexed resources to a resource system, in accordance with the present disclosure;

FIG. 5 is a non-limiting example user interface within an example system configured to provide mapped and indexed resources to a resource system, in accordance with the present disclosure;

DETAILED DESCRIPTION

Figure 2:
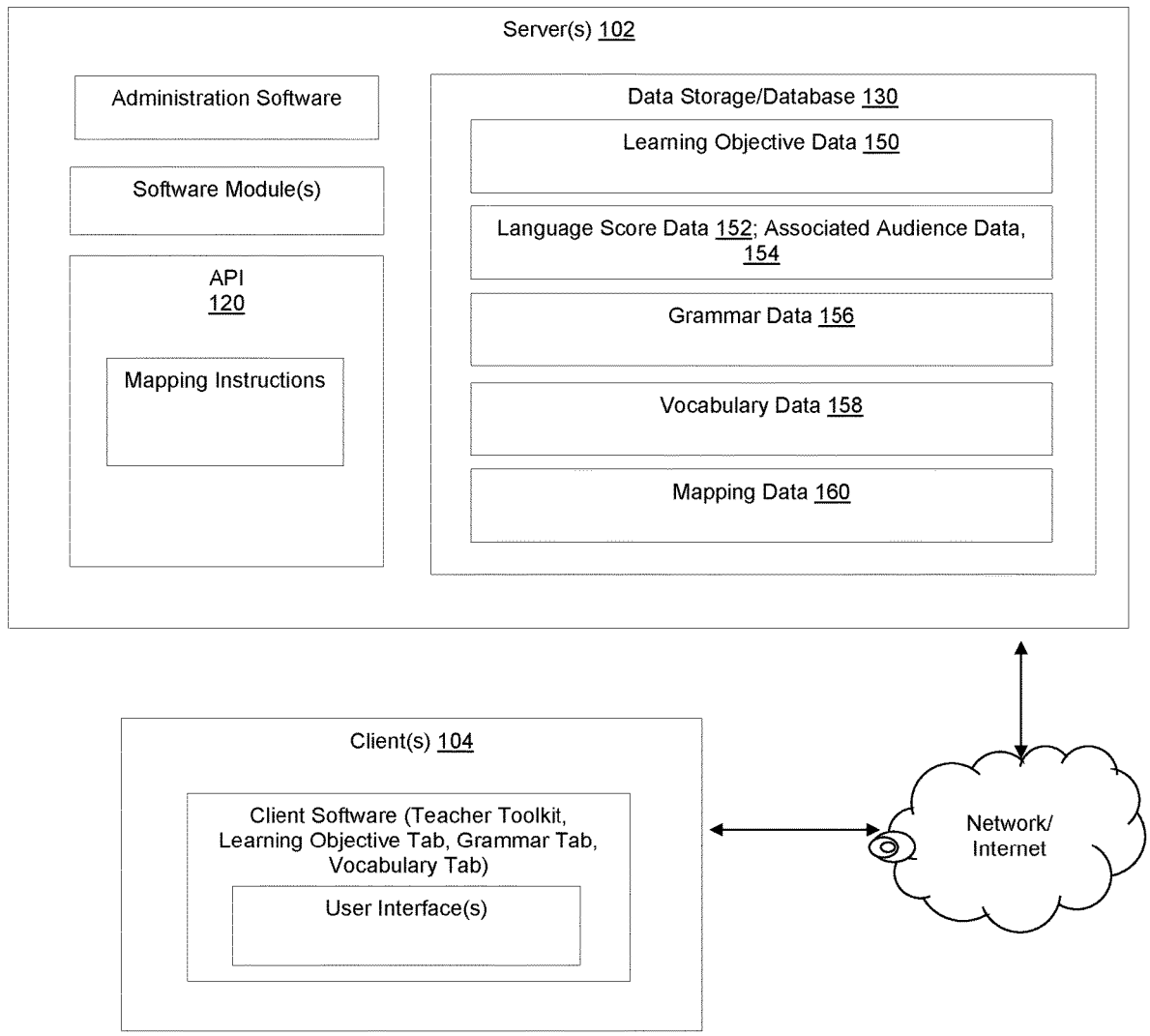
FIG. 2 is a more detailed diagram of an example system configured to provide mapped and indexed resources to a resource system, in accordance with the present disclosure.

The disclosed embodiments include a Global Scale of English (GSE) Teacher Toolkit which provides access to multiple resources. As non-limiting examples, these resources may include GSE learning objectives, vocabulary, grammar, or other any resources to help users such as teachers plan lessons at an appropriate level for the user's students.

In the example embodiments described in detail herein, the systems and methods may apply the GSE scoring methodology. The GSE is a standardized, granular scale from 10 to 90, which measures English language proficiency in each of four functional skills: listening, reading, speaking and writing. The GSE is also used within the disclosed embodiments to indicate proficiency levels and enable skills for grammar and vocabulary. The GSE is psychometrically aligned with the Common European Framework of Reference (CEFR). Unlike other frameworks, which describe attainment in wide bands, the GSE identifies what a learner can do in a more granular way at each point (i.e., integer value) on the scale. It is therefore possible to much more precisely show whether a learner—or a learning objective, as described below—is situated toward the top or bottom, or somewhere in the middle, of a comparatively wide-banded level (e.g., the six wide levels of the CEFR).

The CEFR and the GSE each include a framework of learning objectives with which the scores on the scale are associated. The CEFR and GSE models describe the development of proficiency as quantitative (i.e., how many tasks someone can perform) and qualitative (i.e., how well they perform them). Hence, the quantitative dimension is expressed in terms of communicative activities, while the qualitative dimension is expressed in terms of communicative competencies. The CEFR and GSE also model and scale communicative strategies, viewed as the link between communicative competencies and communicative activities. According to a user's knowledge and abilities, he or she will employ different strategies when performing a given activity. Each CEFR and GSE learning objective are described in terms of the competency they test, and are associated with one of the six levels of the scale.

The GSE framework extends, and fills gaps in, the framework of the CEFR and modifies the way in which the learning objectives are presented. Much like the CEFR learning objectives, descriptors for GSE learning objectives relate to functional activities (i.e., specific language tasks) in addition to competencies. In particular, the descriptors are typically composed of three consecutive elements: performance, describing the language function itself (e.g., "Can answer the telephone [in English]"); criteria, describing the intrinsic quality of the performance, typically in terms of the range of language used (e.g., "using a limited range of basic vocabulary"); and conditions, describing any extrinsic constraints on the performance (e.g., "with visual support," or "if spoken slowly and clearly"). In order to create a set of learning objectives that can support a more granular scale of measurement, the same task frequently occurs at multiple levels of quality; the quality indicators are included in the learning objective itself (i.e., via the criteria). Sociolinguistic and pragmatic competencies are also included in the wording of the learning objectives themselves, rather than being presented as a separate set.

In the GSE, each integer value, or "score," on the scale is associated with one or more learning objectives in each of the four functional skills. Each integer value/score on the scale is also associated with grammar and vocabulary. Someone who is at a particular point on the GSE possesses a 50% probability of being able to perform the learning objectives at that level. The probability is higher for those learning objectives at a lower level, and the probability is lower for those learning objectives at a higher level. That said, language learning is not necessarily sequential, and a learner might be strong in one area, where he has had a lot of practice or a particular need or motivation, but quite weak in another. For that reason, to say that a learner is 'at' a certain level on the Global Scale of English does not mean he has necessarily mastered every GSE learning objective for every skill up to that point. Neither does it mean that he has failed to master any learning objective at a higher GSE score. If an individual is assessed as being at 61 on the scale, it means s/he has a 50% probability of being able to perform learning objectives at that level, a greater probability of being able to perform learning objectives at a lower level, and a lower probability of being able to perform learning objectives at a higher level.

The disclosed embodiments contain, as non-limiting examples: a plurality of GSE learning objectives searchable by audience (e.g., learner type), skill, keywords, and/or GSE/CEFR level; a plurality of GSE grammar objectives, searchable by audience, grammatical category, structure, keywords, and/or CEFR/GSE level; and a plurality of vocabulary item meanings (including multiple meanings for single words and/or phrases), definitions, families, and collocations, searchable by audience, topic, grammatical category, keyword, and/or CEFR/GSE level.

The disclosed embodiments, therefore, may assist a user in: planning, at an appropriate level for their students, a curriculum and course; planning lessons; creating assessments and learning materials, by understanding what the user's students should be learning at each CEFR/GSE level; aligning the user's existing materials to the GSE learning objectives; creating admin reports; and giving feedback to students and parents To plan the curriculum, course, lessons, learning materials, assessments, etc., a user of the disclosed system (e.g., a teacher, an administrator) may search a corpus of learning objectives, grammar, or vocabulary available to the user in the disclosed data store, to create lesson plans appropriate for the user's audience (e.g., the teacher's students).

The corpus of data objects may be generated and aggregated, and the data within the data store populated, from any combination of administrators, such as system administrators, consulting with subject matter experts, such as ELT authors, language experts, lexicographers, linguists, or any other subject matter experts for the requested learning objectives, vocabulary, grammar, lesson plan materials, or any other requested data.

The subject matter experts may be consulted by administrators who input the data used to generate structured data files (e.g., extensible markup language, or XML files, JavaScript Object Notation, or JSON objects, comma delimited text files, etc.) that include the content to be stored within the corpus of data. The stored content (e.g., data object name, resource such as a PDF file, audience, learning level, subject, skill, etc.) may be separated into tags and annotations defining the data to be added to the corpus of data. Once received from the system administrators, or automatically generated by the server following data extraction from a web crawl (described below), the server may transmit each of the generated structured data files to a subject matter expert or experts separate from the subject matter expert that consulted in the generation of the structured data file (e.g., the server transmits an XML file, generated by a system administrator after consulting with a lexicographer, to a teacher who will be using the data), in order to clarify the data. The second-level subject matter expert(s) may then transmit the structured data file to the server. The server may receive the submitted structured data file and automatically import the data in the tags/annotations within the received file into one or more data records, data tables, and/or databases within the data store.

As more and more data objects are received, the collection of documents within the corpus of data objects, such as learning objectives, grammar, vocabulary, or other lesson plan materials, may become extensive, requiring the user to traverse the entire collection of available documents to generate the desired lesson plans. To simplify usability, the disclosed system allows the user to execute a search filtering the results, rather than having to traverse the entire collection. The disclosed embodiments therefore include a server computer configured to generate a user interface (UI), such as the non-limiting example embodiments seen in FIGS. 4-6, including one or more UI controls allowing the user to filter the learning objective, vocabulary, and/or grammar documents returned from a search of the data object corpus. The results of such a search inform users about appropriate teaching objectives, at a particular learning level, for a specific audience, topic, skill, keyword/phrase, learning objective, vocabulary item, grammar point, etc.

For example, as seen in FIG. 4, the user may select a tab or link to search the corpus for learning objectives, and may select a range within the GSE/CEFR scoring level representing a learning level at which the user would like to teach, possibly by adjusting sliders to specify the range of GSE/CEFR scoring levels. The user may also specify the audience to which the learning objectives should be directed (e.g., adults, young learners, professional English learners, academic English learners, etc.) by selecting the intended audience from a drop down menu. The user may also select a skill to be taught (e.g., listening, speaking, reading, writing etc.), possibly selecting the skill from a dropdown menu. The user may also specify keywords the user specifically wants searched within the corpus of learning objectives (e.g., email), possibly using a textbox or text area as seen in FIG. 4.

As seen in FIG. 5, the server may generate a UI, available to the user from a website tab or link, allowing a user to search one or more vocabulary data objects within the corpus and/or within one or more vocabulary inventories incorporated from one or more dictionary databases (e.g., a Longman Dictionary database) to teach students the definition, usage, associated topics, grammar points, and/or collocations associated with the criteria provided by the user using the UI. As with the learning objectives search UI, the user may select or input: a range within the GSE/CEFR scoring level representing a learning level at which the user would like to teach; the audience to which the learning objectives should be directed; and/or keywords the user specifically wants searched within the corpus of vocabulary terms or phrases. Additionally, as seen in FIG. 5, the user may also select a grammatical category for the vocabulary item, possibly using a multi-level dropdown menu, and a topic associated with the vocabulary item or phrase, possibly using a textbox or text area.

Figure 6:
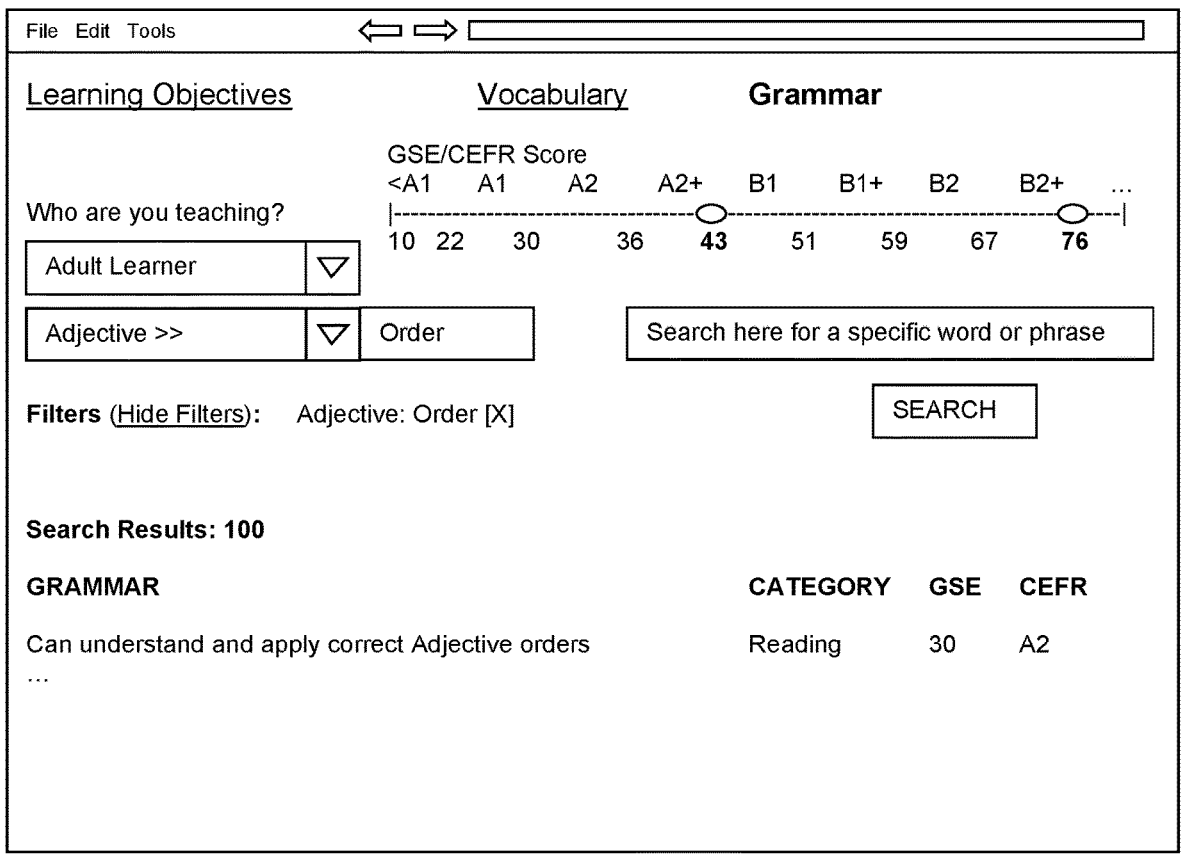
FIG. 6 is a non-limiting example user interface within an example system configured to provide mapped and indexed resources to a resource system, in accordance with the present disclosure.

As seen in FIG. 6, the server may generate a UI, available to the user from a website tab or link, allowing a user to search one or more grammar data objects within the corpus to teach students the application of grammatical points associated with the criteria provided by the user using the UI. As with the learning objectives and vocabulary search UIs, the user may select or input: a range within the GSE/CEFR scoring level representing a learning level at which the user would like to teach; the audience to which the learning objectives should be directed; keywords the user specifically wants searched within the corpus of grammar points; and/or a grammatical category and/or subcategory.

As seen in the example embodiments shown in FIGS. 4-6, in addition to searching a corpus of learning objectives, the user may also select links or tabs to filter the search of the corpus for vocabulary items and/or grammar references. In embodiments such as those seen in FIGS. 4-6, the software to execute these searches may be a single software/website where additional functionality is available through additional links or tabs. In other embodiments, each search may be a separate software module available and executing exclusively from the others. In some embodiments, the corpus of learning objectives, grammar points, and/or vocabulary items may be indexed and mapped in such a way that a user may be presented, for example, with a learning objective that includes relationships with grammar points or vocabulary reflecting the search criteria selected by the user.

On selecting the search UI controller, the client computer submits the search criteria to a server computer. The server computer receives the request, and executes an API call to services located on a separate API host, which executes a database query to identify all education resources (e.g., learning objectives, vocabulary items, and/or grammar points) reflecting the search criteria submitted by the user (GSE score, audience, topic, skill, grammar, keywords), and receives a list of results returned from the API, to be displayed on the UI as search results, allowing the user to download the materials needed for lesson plans appropriate to the audience's language skill level. The server then transmits the list to the user's client for display on the UI, where the user may download the materials needed for their lesson plans.

In some embodiments, the search is submitted directly to the API as a remote procedure call (RPC) to execute a web service. Each of the web services executed by the API may include customized software instructions generated in such a way as to define the web service's response to the RPC. For example, each RPC may include an identification of the client software application making the request, and the API may route the request according to the customized software instructions for that client software application.

This may include querying a mapping database to determine the database or software resources necessary to complete the request. For example, an RPC from the learning objectives tab in the Teacher Toolkit may cause the API to trigger customized software instructions to query the mapping database to determine the database or software resources required to complete the request. The mapping database may indicate that each of the learning objectives reference one or more vocabulary or grammar data records, that the learning objective, vocabulary, and/or grammar data records reference a GSE/CEFR scale score, that the vocabulary record references one or more dictionary terms in the GSE vocabulary database, and that one or more of these dictionary terms also reference the GSE/CEFR scale score. The API/web service may then access the database or software resources mapped to the request in the mapping database in order to compare the search criteria with the parameters in the stored resources, and generate the results to the request in the form of a list of resources available to the teacher for their lesson plans. In addition, these resources may be combined to continue to expand in both types of GSE related resources available and the sheer volume of data there. The server may then transmit the search results to the user within the UI on the user's client computer.

The teacher may print off a list from the search. The teacher may also export the search results using an export button, which may create a PDF of the results. In some embodiments, the printed results include a QR code, which the user may email or otherwise transmit to other users to recreate the filtered search without having to recreate all of the selection criteria on the UI.

Referring to FIGS. 1-2, a computing system 100 in accordance with the present disclosure includes a primary-executing computing device, such as a server 102 having one or more processors that execute device logic within the processor or contained in memory of the server 102. The server 102 may be a server computer or a system of interconnected server computers, such as a web server, application server, application platform, virtual server, cloud data server, and the like, a personal computer, laptop computer, tablet computer, e-reader, smartphone, personal data assistant, set-top box, digital media player, microconsole, home automation system, or similar computing device having a central processing unit (CPU), microprocessor, or other suitable processor. It should be understood that there could be several cooperating servers 102 of homogenous or varying types, layers or other elements, processes or components, which may be chained or otherwise configured, which can interact to perform tasks such as obtaining data from an appropriate data store that is accessible locally to the cooperating server 102 or remotely over the network. The server 102 can include any appropriate hardware, software and firmware for integrating with the data store as needed to execute aspects of one or more applications for the client device, handling some or all of the data access and business logic for an application. The server 102 may provide access control services and is able to generate content including text, graphics, audio, video and/or other content usable to be provided to the user, which may be served to requesting devices 104, 106 in any suitable format, including Hypertext Markup Language (HTML), Extensible Markup Language ("XML"), JavaScript (including JavaScript Object Notation ("JSON")), Cascading Style Sheets (CSS), or another appropriate client-side structured language. Content transferred to a requesting device 104, 106 may be processed by the requesting device 104, 106 to provide the content in one or more forms including forms that are perceptible to the user audibly, visually and/or through other senses including touch, taste, and/or smell.

The handling of all requests and responses, as well as the delivery of content between a requesting device 104 and the server 102, can be handled by the server 102, such as a web server using an appropriate server-side structured language in this example. It should be understood that operations described as being performed by a single device may, unless otherwise clear from context, be performed collectively by multiple devices, which may form a distributed and/or virtual system. Additionally, the server 102 or another computing device can make the content available to other devices and in other services; this includes distributing the content in any form, such as learning objective data, grammar data, vocabulary data, and other data used by or available to the server 102. In some embodiments, the application programming interface (API) 120 described below, or another API (e.g., a representational state transfer ("REST") API) may be configured to enable or facilitate access to the content by another computing device or system. Thus, in disclosed embodiments, server 102 may run business logic, such as building the UI to be displayed on client 104, and the API may execute instances of data searches. In some embodiments, the data may be retrieved from one or more API instances that include an additional layer between the server 102 and the data store 110.

The server 102 typically will include an operating system that provides executable device logic for the general administration and operation of that server 102 and typically will include a computer-readable storage medium (e.g., a hard disk, random access memory, read only memory, etc.) storing instructions that, when executed by a processor of the server, allow the server to perform its intended functions, including the methods steps disclosed herein. Suitable implementations for the operating system and general functionality of the servers are known or commercially available and are readily implemented by persons having ordinary skill in the art, particularly in light of the disclosure. The environment, in one embodiment, is a distributed and/or virtual computing environment utilizing several computer systems and components that are interconnected via communication links, using one or more computer networks or direct connections.

The device logic configures the processor, and thus the server 102, to perform the processes described herein. In some embodiments, the server 102 may be a web server remote from other devices of the system 100 and communicating with such devices over the internet or another suitable electronic network or combination of networks. The server 102 may implement all or a portion of a teacher development toolkit environment operated by a company; the portion of the teacher development toolkit environment operated by the server 102 may include hardware and/or software modules that implement the teacher development toolkit environment and/or user interface generation techniques described herein.

The server 102 may be in communication, such as via an appropriate electronic communication network, with a client terminal 104 (also referred to herein as a client) in control of a user operating the client. The client 104 may be any suitable computing device, such as a desktop or tablet computer, smartphone or other mobile device, and the like. Communications between the server 102 and the client 104 may be encrypted; a user of the client 104 may be required to provide authentication credentials to use the client 104. The server 102 may be remote from the client 104 as described above, or the server 102 and the client 104 may be the same computing device or discrete computing devices physically connected to each other. In some embodiments, the server 102 may be a teacher development toolkit environment server operating the entirety of the teacher development toolkit environment, and a plurality of clients 104 may access the server 102 to perform teacher development toolkit functions related to the teacher development toolkit environment and the like. In some embodiments, the server 102 may be operated by a party other than the company, such as when the teacher development toolkit environment is implemented using third-party service provider software.

A network, as used herein, can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof.

The server 102 may include or be in communication, via an electronic network, with one or more data stores 110. Generally as used herein, a data store may be any repository of information that is or can be made freely or securely accessible by the server 102. Suitable data stores include, without limitation: databases or database systems, which may be a local database, online database, desktop database, server-side database, relational database, hierarchical database, network database, object database, object-relational database, associative database, concept-oriented database, entity-attribute-value database, multi-dimensional database, semi-structured database, star schema database, XML or JSON data object database, file, collection of files, spreadsheet, or other means of data storage located on a computer, client, server, or any other storage device known in the art or developed in the future; file systems; and electronic files such as web pages, spreadsheets, and documents. Each of the data stores may be temporary or permanently implemented. In one embodiment, the server 102 may access a data store 110 using an application programming interface (API) 120, described in more detail below.

A data store 110 may include information used in any teacher development toolkit operation. The data store 110 can include several separate data tables, databases, data documents, dynamic data storage schemes and/or other data storage mechanisms and media for storing data relating to a particular aspect of the present disclosure, including without limitation the data structures and user interface data described herein. It should be understood that there can be many aspects that may need to be stored in the data store 110, such as user, access rights, mapping, language score, learning objective, grammar, and/or vocabulary information, information derived via job processing of GSE related data, map/reduce, or other forms of generated intelligence about the GSE, as non-limiting examples, which can be stored in any appropriate mechanisms in the data store 110. The data store 110 may be operable, through logic associated therewith, to receive instructions from the server 102 and obtain, update, or otherwise process data in response thereto. The server 102 may provide static, dynamic or a combination of static and dynamic data in response to the received instructions. Dynamic data, such as data used in web logs (blogs), web or mobile applications and application interfaces, news services and other applications may be generated by server-side structured languages as described or may be provided by the teacher development toolkit environment or another content management system ("CMS") operating on, or under the control of, the server 102.

As illustrated, a data store 110 may include a plurality of data created in accordance with the present disclosure. This plurality of data may be a database record or set of records, a file, a data stream, or another suitable stored data structure that includes one or more learning objectives 150 or other data associated therewith. This data may include a score 152 (e.g., a GSE score) or another value serving as a quality indicator, and may further include an audience 154, associated with each learning objective 150.

The learning objectives 150 may be obtained from a scoring methodology, such as the GSE, and therefore each may have a score 152 (e.g., on a scale of 10 to 90 for GSE) associated therewith. Furthermore, each learning objective 150 may identify an audience 154 to which it pertains. For example, the GSE framework of learning objectives is divided into four audiences: young learners, Adult learners of General English, learners of academic English, and Learners of Professional English.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, JavaScript or TCL, as well as combinations thereof. The server(s) may also include database servers, including those commercially available from Oracle®, Microsoft®, Sybase®, cloudDNA®, and IBM® as well as open-source servers such as MySQL, Postgres, SQLite, MongoDB, and any other server capable of storing, retrieving, and accessing structured or unstructured data, including those at third-party service providers such as AMAZON, MICROSOFT AZURE, or GOOGLE. Database servers may include table-based servers, document-based servers, unstructured servers, relational servers, non-relational servers or combinations of these and/or other database servers.

The present systems can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

Figure 3:
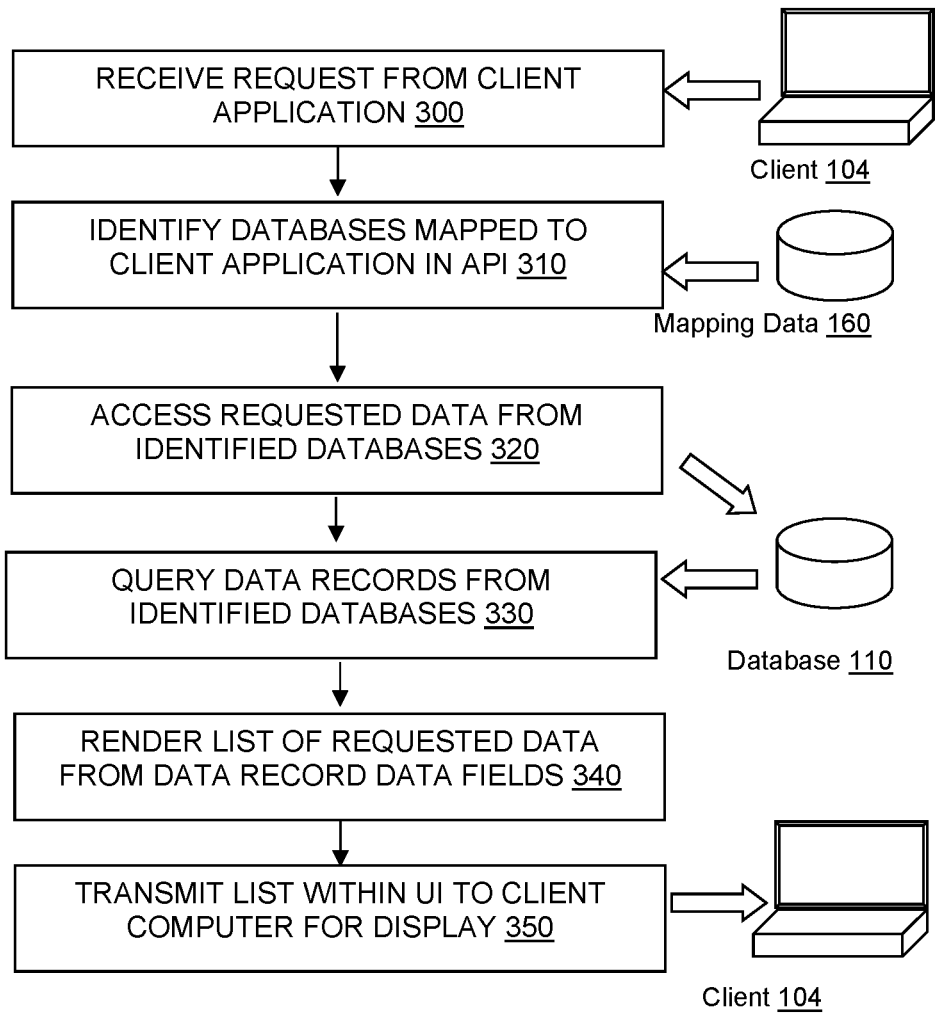
FIG. 3 is a flow diagram including method steps executed within an example system configured to provide mapped and indexed resources to a resource system, in accordance with the present disclosure.

FIG. 3 illustrates a method by which the server 102 may receive a request from a software application (e.g., UIs seen in FIGS. 4-6), running on a client 104. In step 300, a user may request data from a corpus of data stored within data store 110. In some embodiments, this corpus of data may be generated, and the data within the data store 110 populated, by any collaboration between system administrators, ELT authors, language experts, lexicographers, linguists, or any other subject matter experts in the subject matter of the requested learning objectives, vocabulary, grammar, or any other requested data.

For example, the GSE values assigned to, and associated with, the GSE values given to each word meaning for vocabulary items are based on existing research into vocabulary size. Most of this research is concerned with comprehension (reading) rather than production (speaking and writing). Therefore the GSE values given ought to be used as an indication of the stage at which a particular word meaning should be understood by learners of English. The GSE values also show relative importance of vocabulary in language and are therefore helpful when prioritizing vocabulary items within the same topic. In addition, the terms or phrases for each created data object may import data from a dictionary database, such as the Longman Dictionary database, which is then enriched with GSE data.

The system administrators, after consulting with subject matter experts, may input data used to generate structured data files that include the content to be stored within the corpus of data. Any means of inputting the data into the structured files may be used. For example, in some embodiments, XML, files may be generated from a UI presented to the subject matter experts on a client computer, which may be rendered by the server 102 and transmitted to the client 104 for display. The data objects for the learning objectives, vocabulary items, and/or grammar points, for example, may be input into the UI.

The UI may comprise UI controls allowing the system administrators to input, for example, learning objectives data, vocabulary data, grammar data, scoring data (e.g., the GSE and/or CEFR score associated with input data), dictionary data associated with the data (e.g., Longman Dictionary data used with vocabulary), the software associated with the data (e.g., Teacher Toolkit, Learning Objectives Tab), etc. The client computer may receive this input data, and either the client 104, or the server 102 (after receiving the submitted data) may convert the data into an XML file. In other embodiments, the subject matter experts may generate an XML file as a plain text file on the client 104, for example.

In embodiments where the structured data files include XML files, the structured data files may include one or more tags, according to a schema recognized by the disclosed system, for storing the data and/or other annotations associated with the stored data. Server 102 may utilize the generated tags and/or annotations to index the stored data according to an intended data usage, and/or to map the stored data to one or more additional data and/or software resources used within the disclosed system (e.g., GSE scale).

For example, the subject matter experts may input learning objective data into a structured data file such as an XML file. The learning objective data (possibly within a learning objective data object, <learningobjective></learningobjective>) may include: a title of the learning objective (e.g., <title>Can understand simple descriptions of people's appearance</title>); a GSE/CEFR score associated with the data/learning objective (e.g., <gsescore>30</gsescore><cefrscore>A2</cefrscore>); resources (e.g., PDF documents, website URLs) available for the learning objective (e.g., <resource>learningobjective.pdf</resource><resource>www.pearson.com/learningobjective.html</resource>); an audience for which the data/learning objective is intended (e.g., <audience>Academic Learner</audience>); a skill associated with the learning objective (e.g., <skill>Reading</skill>); one or more software applications to which the data should be mapped (e.g., <application>Teacher Toolkit Learning Objective Tab</application>); additional database resources that the software application utilizes (e.g., <dbresource>GSE Scale Database</dbresource>; etc.

In another example, the subject matter experts may input vocabulary data into a structured data file such as an XML file. The vocabulary data (possibly within a vocabulary data object, <vocabulary></vocabulary>) may include: a vocabulary item (e.g., <vocabularyword>ball</vocabularyword>); a definition (e.g., <definition> a round object used in sports . . . </definition>); a GSE/CEFR score associated with the data/vocabulary item (e.g., <gsescore>30</gsescore><cefrscore>A2</cefrscore>); resources (e.g., PDF documents, website URLs) available for the vocabulary item (e.g., <resource>vocabularylist.pdf</resource><resource>www.pearson.com/vocabulary.html</resource>); an audience for which the data/vocabulary item is intended (e.g., <audience>Academic Learner</audience>); a topic associated with the vocabulary item (e.g., <topic>Sports, Hobbies, Interests</topic>); a grammatical category associated with the vocabulary item (e.g., <grammaticalcategory>Noun</grammaticalcategory>); related collocations associated with the vocabulary item (e.g., <collocation>hit the ball</collocation>); one or more software applications to which the data should be mapped (e.g., <application>Teacher Toolkit Vocabulary Tab</application>); additional database resources that the software application utilizes (e.g., <dbresource>GSE Scale Database</dbresource>); etc.

In another example, the subject matter experts may input grammar data into a structured data file such as an XML file. The grammar data (possibly within a grammar data object, <grammar></grammar>) may include: a grammatical category (e.g., <principle>adjective</principle>); a GSE/CEFR score associated with the data/grammatical principle (e.g., <gsescore>30</gsescore><cefrscore>A2</cefrscore>); resources (e.g., PDF documents, website URLs) available for the grammatical principle (e.g., <resource>grammarrules.pdf</resource><resource>www.pearson.com/grammar.html</resource>); an audience for which the data/grammar is intended (e.g., <audience>Academic Learner</audience>); a grammatical category associated with the grammar (e.g., <grammaticalcategory>Adjective/Order</grammaticalcategory>); related keywords associated with the grammatical principle (e.g., <keyword>future perfect</keyword>); one or more software applications to which the data should be mapped (e.g., <application>Teacher Toolkit Grammar Tab</application>); additional database resources that the software application utilizes (e.g., <dbresource>GSE Scale Database</dbresource>); etc.

Server 102 may utilize any combination of artificial intelligence (e.g., machine learning) and/or software instructions stored in memory and including device logic created and maintained by system designers or administrators to analyze the data records generated from the structured data files, and apply the device logic to execute a web crawl of multiple websites and/or web pages on the Internet. Using the machine learning and/or device logic, the server 102 may analyze the language from the crawled websites/web pages (e.g., meaning and frequency of vocabulary items, how are people searching for the data) and perform a data extraction to automatically generate additional structured data files, according to the data from previously created structured data files stored in the data store, including, for example, tags/ annotations for learning objectives, vocabulary items, grammar, scoring (e.g., positively tying the crawled data to GSE learning objectives or levels), data or software resources, etc., associated with the extracted data.

Once received from the subject matter experts, or automatically generated by the server 102 following data extraction from the web crawl, the server 102 may transmit each of the generated structured data/XML files to a different subject matter expert than the original subject matter expert that generated the structured data file (e.g., the server transmits an XML file generated by a lexicographer to a teacher who will be using the data), in order to clarify the data. As above, the receiving user may access a UI on a client computer, which may display the learning objective, grammar and/or vocabulary data and the associated GSE/CEFR scores associated with the data, and/or any other annotations tagged within the XML file, and make the necessary corrections to the structured data file using UI controls for each of the tags/annotations, or may edit the structured data file directly.

The data within the online searchable database described below, may therefore comprise a reference developed over a number of years in collaboration with teachers, ELT authors, lexicographers, and/or language experts from around the world. The research from this collaboration may be ongoing so that any additional data, including feedback on the GSE values, may be constantly collected from teachers and language experts to validate the GSE values for the associated learning objectives, grammar, and/or vocabulary. After reviewing the structured data files containing the data objects, the second-level subject matter expert may then transmit the structured data file (possibly by selecting a submit button on the UI) to the server 102.

The server 102 may receive the submitted structured data file and automatically import the data within the tags/annotations in the received file into one or more databases within the data store 110. As seen in FIG. 3, the data store 110 may include data objects, such as the learning objectives 150, vocabulary items 158, and/or grammar rules defining grammar 156. Additional data objects may be stored in the same or different databases within the data store 110, including, as non-limiting examples, software, reference, logic rules and/or mapping resources such as: learning scales (e.g., the GSE and/or CEFR scales); reference dictionaries such as the Longman Dictionary; and/or PDF or other online documentation for learning objectives and/or related vocabulary or grammar data. The databases may also include additional data objects mapping these various resources to each other and to the client software applications that access them.

Server 102 may access a front end database interface, accessing any combination of No-SQL and/or relational databases, and insert the structured data file data objects (e.g., from the <learningobjective>, <vocabulary>, and/or <grammar>data objects in an XML file) into data records within the data store 110. For example: each learning objective data object may be input as one or more learning objective data records into one or more learning objective data tables within a learning objectives database 150. Each learning objective data record may include data fields for a unique identifier identifying the data object, and may include or reference data fields, data records, and/or databases for the title, description, GSE/CEFR score, audience, skill/topic, grammatical category, software application, etc. associated with the learning object 150.

Similarly, each vocabulary data object may be input as one or more vocabulary data records into one or more vocabulary data tables within a vocabulary database 158. Each vocabulary data record may include data fields for a unique identifier identifying the data object, and may include or reference data fields or data records for the vocabulary item, definition, GSE/CEFR score, audience, topic, grammatical category, dictionary, software application, etc. associated with the vocabulary data 158.

Similarly, each grammar data object may be input as one or more grammar data records into one or more grammar data tables within a grammar database 156. Each grammar data record may include data fields for a unique identifier identifying the data object, and may include or reference data fields or data records for the grammar point, grammatical category, GSE/CEFR score, audience, software application, etc. associated with the grammar data 156.

In the non-limiting example embodiment seen in FIG. 1, the data utilized by the disclosed system may include databases 110 for the organization operating the disclosed system, but may further include data within additional external 3rd party data stores 112, which may store additional data objects, and indexes and/or mappings defining the relationships between the data objects and resources, as described below. In other words, all of the mapped objects in the disclosed system (e.g., proficiency scores, learning objectives, grammar, vocabulary data resources, mappings, etc.) do not need to originate or be stored in data store 110. Other objects may be referred to in other systems or data stores 112, possibly using a uniform resource identifier (URI), or a request through Semantic Web relationships, or a request for a web service via an RPC to an API, as non-limiting examples.

Returning now to step 300 in FIG. 3, the request received from the client application may be a request to access specific data in the data store 110, disclosed above. In order to maximize efficiencies for locating the data within the data store 110, the data objects, as well as all associated system resources and associated client applications, may be indexed within a mapping database.

In some embodiments, third party technologies may be used to index the data. As a non-limiting example, ELASTICSEARCH technology may be used to create a high performance environment capable of indexing the data objects according to the server's 102 analysis the received structured data tags and/or data fields for each data object, in order to expose to the API described below, the relationships between the data sources, the available resources, the client applications, and the intended utilization of these assets.

As non-limiting examples, the mapping database may include a language score data table including one or more language score data records, each with a unique identifier, and defining the various levels or score ranges in the GSE/CEFR. The mapping database may also include a dictionary data table including one or more dictionary data records, each with a unique identifier, and including vocabulary items, definitions, grammatical categories, collocations, etc. associated with the vocabulary item. The mapping database may also include a grammar reference data table including one or more grammar data records, each with a unique identifier, and including grammar rules, principles, references, etc. associated with each grammar rule/principle. The mapping database may also include a client application data table including one or more client application data records, each with a unique identifier, and including identification of client applications that may request the data objects or other resources within the data store 110.

The mapping database may further map each data object to the index for one or more additional data objects, and/or to one or more of the assets or resources listed above. For example, additional data fields within the mapping database may reference indexes referencing other data records, tables, or databases, in order to map the data record containing the data field to the resources needed for the request (e.g., vocabulary data objects mapped to Longman Dictionary data records mapped to GSE scores).

In some embodiments, the request in step 300 of FIG. 3 may include a request for the server to execute an RPC to be executed by an API running on the server 102, as a requested web service, on behalf of the requesting client application (e.g., Pearson's GSE TEACHER TOOLKIT, GSE ADMIN TOOL, VIRTUAL PLS, etc.). Thus, in some embodiments, the API may be a single point of entry to any client applications, and RPCs may define a separate search functionality to meet the needs of each of these client applications. Therefore RPCs for each client application may be created/generated, and the mapping database may map the API calls to various data objects and/or assets within the system.

The request in step 300 of FIG. 3 may be routed through the network to the API, and the server 102 may identify the requesting client application and execute the associated RPC/web service function. The API may identify the data objects and other assets required by the requesting application according to the relationships between the data objects and assets exposed to the API in the mapping database (e.g., the relationships between the data records for assets associated in the mapping database with the interfaces displayed within the tabs of the Teacher Toolkit, the language score data, the dictionary data associated with vocabulary data, the mapping data, etc.).

The API may analyze and utilize unique domain knowledge to create relationships between the GSE scale/learning objectives and data objects stored in the database. These relationships may be identified through the indexing of data objects available through the API, as described in more detail below. Such indexing may utilize ELASTICSEARCH technology to index all data objects and identify the relationships. In the disclosed embodiment, a relationship may be created between the GSE scale and dictionary words, and both new indexes may be built in ELASTICSEARCH and new API calls to support searching vocabulary. This allows a mapping between learning objectives and data objects. The API may therefore use the unique domain knowledge and relationships and deliver data unique to the domain knowledge of the relationships between the GSE scale/learning objectives and the data objects stored in the database.

The relationships may evolve over time as additional GSE related software and other tools are introduced, which utilize the intelligence gained from the stored data and relationships to expose additional GSE intelligence through the API. This may include data about the use of the GSE, the object relationships, and learners' progress within the GSE (i.e., records of an individual's progress within the GSE) generated by proprietary or specifically defined jobs/processes.

It should be noted that the search does not depend on the disclosed UI. The API alone may execute a similar search and return a result set. While the UI guides and helps the user to make a good search that is supported by the API, additional tools may be used to form a search. Any UI capable of creating a supported API call may be used. IN this way, the data behind the application may be obtained by any authorized Web page (e.g., authorization via pre-arranged appID and secret-based authentication).

A non-limiting example demonstrates the progression of the request through the disclosed system: The server may receive the request for a learning objective in step 300, which may identify the requesting client application and an RPC to be executed on the server 102. The RPC may be configured to access one or more mapping data records within the mapping database, and use the indexing of the data objects and assets to determine that the request will require access to the GSE/CEFR score database 152, and that the request further requires access to the vocabulary 158 and grammar 156 data objects within the appropriate databases. The vocabulary data objects 158 required by the request may further require access to refreshed data imported from the dictionary database to retrieve the necessary vocabulary, definition, grammatical category, collocations, etc. Using the indexing within each of these databases, the API 120 may access the data objects and other assets needed to generate the results for the request.

FIG. 3 illustrates a method by which the server 102 may receive a request for data objects from a client application UI, access the API mapping the request to the indexed data objects or other assets or resources, query the associated data store 110 or other resource, and generate a list of returned data objects and the means to access them. The user providing the user input/request may be using the client 104 or another suitable input device having a connection to the server 102. The server 102 may render and transmit a UI to the client 104, which the client 104 then displays to the user. The UI may enable the user to view data sent to the client 104 by the server 102, and to enter user input that the client 104 transmits to the server 102, according to the method.

A non-limiting example may help to demonstrate the method steps and software modules, executed in the environment described above and collectively known as the GSE Teacher Toolkit, demonstrated in FIGS. 1-6. The GSE Teacher Toolkit may be useful, for example, for teachers when planning a curriculum, lesson or assessment (e.g., creating admin reports and giving feedback to students and parents), by checking exactly what students should be learning at each GSE/CEFR level. As noted above, system users (e.g., teachers), may desire online access to specific learning objectives, vocabulary terms, and/or grammar references, according to the audience and rating of the learning objectives, rather than having to sort through/click on several web pages of PDF file lists, for example.

Returning to FIG. 3, at step 300, the user submits a request via a client application running on client 104 (e.g., the Learning Objectives, Vocabulary, and/or Grammar tabs within the disclosed Teacher Toolkit software), which transmits the request, including search parameters for the request, the requested data objects, and the requesting application to the server 102, which receives and decodes the request. In step 310, the server identifies one or more data stores 110 or other resources needed by the requesting client application to complete the request. In step 320, the server 102 queries the data store(s) 110 to select and retrieve the requested data objects, such as data records within data tables within the databases 110. In step 340, server 102 renders a list (possibly within a UI control displaying data fields within data records), displaying data from the data objects, and in step 350, the server 102 transmits the list to the client 104 for display. In some embodiments, server 102 tracks every search made via the UI, and analyzes this data in order to improve results, quality of content, and site functionality.

In some non-limiting example embodiments, such as those seen in FIGS. 4-6, the client application may include a web-based search for a specific learning objective, vocabulary term or phrase and/or grammar reference or point. In these embodiments, the user input transmitted to the server at step 300 may include search criteria associated with the client application, such as, for example, a range of language competency scores, a selection of or an audience, a topic or skill, a grammatical category, or one or more keywords or phrases associated with the learning objective, the vocabulary item, and/or the grammar point.

To generate the search criteria in the requested search, teachers may access a website/web page (e.g., Pearson's GSE Teacher Toolkit website, available online), which may include a UI search tool such as that seen in FIGS. 4-6 and described below. Server 102 may access and run one or more software modules configured to render and transmit, to client 104 for display, the user interface for accessing the search functionality. As seen in these FIGS. 4-6, the rendered and displayed UI may include a series of links or tabs, allowing a user to access software modules for searching, for example, learning objectives, vocabulary items, and/or grammar points. The Learning Objectives tab may allow the user to search Learning Objectives by learner type, skill or CEFR/GSE level. The Grammar Objectives tab may allow the user to search Grammar Objectives by grammatical category, structure or CEFR/GSE level. The vocabulary item meanings tab may allow the user to search vocabulary item meanings by topic, grammatical category or CEFR/GSE level.

The learning objective tab may include a topic and/or professional learning objective to be covered by and associated with the learning objective (e.g., email communication, listening as part of an audience, etc.), grammar or vocabulary principles associated with the learning objective (e.g., adjective usage), and/or keywords within the learning objective (e.g., email, ball). The vocabulary search may effectively be a dictionary database that the user can search by topic or token, with each word having been assigned a level according to the GSE. In other words, the user may search for topics and find the vocabulary that's relevant at a certain GSE/CEFR learning level. The returned words may be in the form of a list, which may be limited to a specific number of words or phrases (e.g., 50). However, as noted above, the results may include a QR code enabling the user to share the full list with others. The grammar search may include a search for available PDF files according to grammatical category, level, and a number of grammatical areas and sub areas. For example, the teacher may want to teach a class about present perfect as a grammar point. The teacher may search the database for present perfect and the search result may return multiple principle documents that are all about that topic, which the user may download.

After accessing the desired software application, the user may navigate to the search UI using the appropriate website, link, tab, etc. Each search UI may include one or more UI controls. In this example, the teacher may select specific search criteria within the UI, and submit the search. As non-limiting examples, these search criteria for learning objectives, vocabulary, and/or grammar may include a learning level the teacher desires (e.g., a GSE/CEFR scale slider UI control), an audience, a topic or skill, and one or more keywords associated with the search. Although the non-limiting examples in FIGS. 4-6 demonstrate specific combinations of these UI controls, any combinations of these UI controls may be used within any embodiment disclosed herein.

Returning now to FIGS. 4-6, various disclosed embodiments may share UI controls with common features for receiving user input, specifically the search criteria input by the user using the UI controls. As a non-limiting example, a teacher may wish to identify a range of scores for the GSE/CEFR level associated with the learning objectives, vocabulary items, and/or grammar points that the user wants to search. The user may select a specific range representing the ability level for the learning objectives, vocabulary items, and/or grammar points that they would like to search, or may leave the default setting to search across all ability levels. In the embodiments demonstrated in FIGS. 4-6, the slider UI control may display both the CEFR on top of the slider UI control, as well as the GSE on the bottom of the slider UI control, providing the user with a fast and easy way to visualize the desired ability levels for available information.

Another non-limiting example of common UI controls in FIGS. 4-6 includes a UI control for defining an appropriate audience or specific group for the requested resources used in the lesson plans. In the non-limiting examples demonstrated in FIGS. 4-6, the UI control may include a dropdown menu, allowing the user to select from Adult Learners of General English, Learners of Academic English, Learners of Professional English and Young Learners (aged 6-14).

Another common UI control may include a specific skill or a topic the user is interested in teaching. In the non-limiting example demonstrated in FIG. 4, the UI control may include a dropdown menu for the skill reflected by the learning objectives the user would like to teach, allowing the user to select from skills such as Reading, Writing, Listening, Speaking. In some embodiments, the user may select multiple skills, or leave that UI control blank, in which case the software modules would search all available skills within the data objects and other available resources.

In the non-limiting example demonstrated in FIG. 5, the UI control may include a dropdown menu for a topic that demonstrates the vocabulary item or phrase that the user wants to teach. With any dropdown menu disclosed herein, the selection of any menu item may trigger a sub-menu to be displayed, which the user may select to define specific search criteria that the user wants to be included in the search of the available data objects and/or resources. For example the menu may include the topics: body and health; business industry and the economy; clothes; fashion and beauty; countries; cities; towns and public places; etc. If the user selects the topic body and health, a sub-menu may appear including medicine and medical treatment; death and stages of life, etc., and if the medicine and medical treatment is selected, another dropdown menu, or a sliding menu may present the user with the additional topics branches of medicine, healthcare workers, places for medical treatment, treatments and medicines, for example.

Another common UI control may include a grammatical category the user is interested in teaching in association with a vocabulary item or grammatical point, for example. In the non-limiting example demonstrated in FIG. 5, the UI control may include a dropdown menu for the grammatical category associated with the vocabulary item (or possibly with a grammatical point in FIG. 6) the user would like to teach. In some embodiments, the user may select multiple grammatical categories, or leave that UI control blank, in which case the software modules would search all available grammatical categories within the data objects and other available resources.

In the non-limiting example demonstrated in FIG. 5, the UI control may include a dropdown menu for grammatical category that demonstrates the grammar point associated with the vocabulary term or phrase that the user wants to teach. As with any dropdown menu disclosed herein, the selection of any menu item may trigger a sub-menu to be displayed, which the user may select to define specific search criteria that the user wants to be included in the search of the available data objects and/or resources. For example the grammar search may include a specific grammatical category the user is looking for, e.g., Adjectives and Adverbs, Clauses, Conjunctions, Determiners, Modal Verb, Noun, Phrasal Verb, Phrase, Preposition, etc. If the user selects Adjectives and Adverbs, the user may be presented with a submenu of Comparison, Formation, Order, Position, etc.

Another non-limiting example of common UI controls in FIGS. 4-6 includes a UI control for the user to input an open-search. This receives a specific search term or phrase from the user within the text box or field. For example, on the Learning Objectives web page, if the user wants to see all the GSE Learning Objectives about emails, the user types 'email' into the box. On the Vocabulary web page, if the user wants to find the CEFR/GSE level for the different meanings of the word 'ball' then the user types 'ball' in the text field. On the Grammar web page, if the user wants to see GSE Learning Objectives about the future perfect tense, the user types 'future perfect' into the box. The user may include Boolean search terms (AND, OR, " . . . ", NOT) in the text field to create advanced searches. For example, for Learning Objectives, the user may input 'email OR letter' and for Grammar, the user may input 'irregular AND superlative.' For Vocabulary, a user may input 'ball' to get an exact match, rather than all words starting with the letters 'ball' such as 'ballroom' or 'ballerina.'

As an example of the use of these available search criteria, a user may want to generate and teach a lesson describing the appearance of a person's hair. The user may select the Learning Objectives and/or Vocabulary links or tabs. Within the web page navigated to from these links or tabs, the user may input data into the UI controls. For example, the user may select or input keywords/phrases indicating that they want to teach a person's appearance or hair as the topic. The user may then adjust the slider to reflect a lower GSE/CEFR score, where the server would generate and display a list of search results including data objects for teaching the concepts of short/long, straight/curly, brown/black/blonde, etc. If the user adjusted the slider to reflect a higher level (e.g., CEFR B2), the vocabulary may include more advance terms, such as permed, ginger, fringe, sideburns, pigtail, etc.

A final non-limiting example of common UI controls in FIGS. 4-6 includes a submit button allowing the user to submit their search to the server 102. By selecting the submit button, the client computer submits all of the input search criteria from the UI, including the client application requesting the data objects and other resources, to the server computer, to find the results.

The server 102 may execute a database query to identify the data objects and other resources requested, generate a result list for these data objects and/or resources, and transmit the result list to the client computer for display on the UI.

The queried items within the database may include the learning objectives, vocabulary, and/or grammar data objects input into, and indexed within, the database 110 as disclosed above. For example, as seen in FIG. 2, the database 110 may store a number of learning objectives 150, grammar objectives 156, and vocabulary objectives 158.

The data objects for the learning objectives 150 (also known as "can do statements") may be developed and rated for a number of different audiences 154. These audiences may include general Adult learners of General English, young Learners, professionals, learners of professional English, and learners of academic English. These learning objectives for each of the different audiences may be stored as downloadable documents (e.g., PDFs) made available on the UI. The server may receive a request for these documents, and transmit the learning objectives 150, as downloadable documents, to the client computer 104.

The data objects for the vocabulary objectives 158 may also be developed and rated for a number of different audiences 154. These audiences may include Adult learners of general English, young learners, professionals, learners of Professional English, and learners of Academic English. The vocabulary objectives 158 for each of the different audiences may also be stored as downloadable documents (e.g., PDFs) made available on the UI. The server may receive a request for these documents, and transmit the vocabulary items 158, as downloadable documents, to the client computer 104.

The data objects for the vocabulary objectives 158 may further include word definitions, including different definitions of the same word, according to semantic tags for each word in the database. Each separate definition of each vocabulary item may be associated in the data store 110 with its own learning level. For example, a ball associated with sports, may be associated with a GSE score of 18, while a ball referring to a formal social event may be associated with a much higher GSE score of 64. Each separate definition may further be associated in the data store with collocations associated with that word.

Collocations may include words that frequently go together with the search term, so that the user is able to teach, and the student is able to learn an entire phrase around the defined word, not just the individual words themselves. Learners of English need this information since it cannot always be translated directly from their first language. For example, a person may refer to 'broad shoulders' rather than 'wide shoulders,' but may refer to 'wide hips' rather than 'broad hips.' In this example, both 'broad' and 'wide' may have the same translation in other languages. As the results are displayed to the user, the user may also access the collocations associated with the each defined term.

As noted above, the server 102 may be running an API 120. In these embodiments, the submission of the search criteria may be sent directly to the API for processing. On receiving and decoding the transmission of the search criteria, the server 102 may access the API 120, and access and execute an RPC configured to map the requesting client software application and the request parameters/input to the appropriate databases within the data store 110, according to the index data within the data store 110.

As the server 102 executes the database query, the received search criteria may be incorporated into the query. The query may be executed within each of the databases, or other data stores 110, required for executing the query according to the indexes mapping the client application to the RPC, and the request from the client application to the at least one database.

The server 102 may query the database for the results, and identify how many results were found. To accomplish this, the Server 102 may access the database to identify learning objectives 150, grammar objectives 156 and/or vocabulary 158 matching the input parameters. The server may then render a results list, possibly within a UI control for displaying the results list on the UI. The results may include the data objects returned from the database query, such as the learning objectives 150, the vocabulary items or data 158, and/or the grammar references or principles returned from the data query 156.

The UI control for the query results may include a heading displaying the number of results found. The server 102 may then render, within the UI control for displaying the results, the data from the data fields for each of the results. For example, a learning objective result may select the learning objective, skill, GSE score and CEFR level from each data record matching the query, and generate a table of each search result, similar to that seen in FIG. 4. In some embodiments, not shown in FIG. 4, additional links may be generated, to one or more related vocabulary items or grammar points (or any resources associated with the results—e.g., vocabulary/grammar related to or required to understand the learning objective that match the search criteria originally submitted).

In some embodiments, the search results may be ordered from a lowest learning score to a highest learning GSE value to a highest GSE value. The search results may then be reordered according to any search criteria and/or displayed results, according to a selection by the user.

The results may then be displayed, possibly in table format, on UI on the client computer. In addition to the content described above, the UI may include page numbering to move between pages of results. The default order may be according to the GSE/CEFR level, from lowest to highest, so that the teacher's lesson plans progress from the least complicated concepts to the most complicated. However, the user may order the results any way they prefer by clicking on the header in the top of each column representing the returned data fields.

For vocabulary results, for example, the results may include vocabulary terms and definitions. To display the definition of each word, the user may hover over the word. Each meaning of each resulting word may also display a GSE/CEFR value. For example, 'ball—a round object that you throw, hit, or kick in a game or sport' is introduced early on and given a GSE value of 18, whereas 'ball' meaning 'the rounded part at the base of the toes or at the base of the thumb' is much higher and given a GSE value of 74. The user may also click on a displayed down arrow for each of the resulting vocabulary items to reveal additional information, including definitions, examples and collocations (ordered from most frequent to least frequent collocations, possibly included limitations on the lists of available collocations). An up arrow may also be provided to hide the information. This functionality may also apply to learning objectives and grammar.

In some embodiments, the user may save and/or print the search results. For example, the search may be saved, so that once the user completes a search, they can save it, so that it can be repeated without going through the mechanics of entering all the search criteria into the UI again. The user may also send the search results to another user, possibly including a URL for the search, where it can also be repeated without inputting search criteria.

The user may also print the search results, possibly including a list from the search. In some embodiments, these results may be exported into an electronic document, such as a PDF document. In some embodiments, these results may be limited (e.g., 50 results maximum) to avoid the user downloading the entire database. In some embodiments, the printing may include a QR code, allowing the user to scan the printed results into an electronic device, such as a cell phone running an app, and reproduce the search without having to access the UI and inputting the search criteria. In some embodiments, these results may be transmitted (downloaded) directly to the user's cell phone.

In some embodiments, the server may organize the results into a specific lesson plan for the teacher, and the user may use the related/associated links within the results to organize the lesson plan accordingly. The user may then download all materials, possibly in electronic document form, as a unit of teaching. These downloaded materials may then be used for teaching offline.

In some embodiments, the lesson plans may be personalized for each teacher. For example, a teacher may log into the disclosed system using specific authentication credentials. Once logged in, the teacher may be able to save their favorite searches and create lesson plans as disclosed above, and these searches and lesson plans may be associated with the teacher's user account stored in the database 110.

Similarly, the disclosed system, and/or the students of users of the disclosed system, may also create personalized courses. For example, a student may select multiple learning objectives that the student wants to focus on, which may include particular goals. Based on these practical goals, the server 102 may generate a sequential list of learning objectives together, providing the student with a 20-hour course, a 30-hour course, etc.

As noted above, some embodiments may specify an appropriate age for users and/or users' students according to a number of different parameters. For example, as text to be input, the server 102 may determine which K-12 grade or GSE/CEFR level that the input text is appropriate for. In some embodiments, difficult words for the appropriate level may be highlighted.

In some embodiments, the data objects may be designated as free or paid content. In these embodiments, users may access the free content, but the free content may be used to upsell the user to paid content, possibly via advertisements and/or links to the paid content. In some embodiments, social interaction between tool users may occur and be tracked. As non-limiting examples, such social interaction may include 'likes,' comments, ratings, etc. that help other users find valuable and useful results. The UI may be altered in these embodiments to include social elements, and the disclosed system may then use the data collected to drive the types and ordering of results.

What is claimed is:
1. A system comprising a server, comprising a computing device coupled to a network and including at least one processor executing instructions within a memory which, when executed cause the system to:
receive, from a first Graphical User Interface (GUI) on a first client device, a first user input comprising:
a learning objective content associated with a learning curriculum, lesson, or assessment; and
a plurality of value pairs defining:
an intended audience for the learning objective content;
a skill to be taught and assessed in association with the learning objective content;
a learning scale score or range of scores measuring a proficiency associated with the skill, and indicating a stage at which a learning objective should be understood by a learner; and
a client software application associated with the learning objective content and the plurality of value pairs;
automatically convert the plurality of data pairs into at least one database record;
store the learning objective content within a repository of electronic content in association with the at least one database record;
generate an index, creating a map within the network to the learning objective content, the value pairs, and at least one data dictionary comprising at least one additional resource associated with the learning objective content;
receive, from a second GUI on a second client device, a second user input comprising a request including a selection matching the intended audience, the skill, and the learning scale score or range;
identify a client application from which the request was received;
generate a Remote Procedure Call (RPC) customized to the client application;
route the RPC as a request to an Application Programming Interface (API);
execute, by the API according to the index, a database command:
   selecting the learning objective content from the database, ranked according to the learning scale score or range; and
   accessing the data dictionary;
render, on the second GUI, a user interface control comprising at least one quick response (QR) code storing:
   at least one list item including a link to access the learning objective content; and
   at least one instruction for recreating the request.

2. The system of claim 1, further comprising:
a topic associated with an objective, a vocabulary item, or a grammar point;
a selection of a range of language competency scores;
the audience for the objective, the vocabulary item, or the grammar point; and
a request to generate a list, within the selected range and appropriate for the audience, of the objective, the vocabulary item, or the grammar point.

3. A system comprising:
a server, comprising a computing device coupled to a network and including at least one processor executing instructions within a memory which, when executed cause the system to:
   receive, from a first Graphical User Interface (GUI) on a first client device, a first user input comprising:
      a learning objective content associated with a learning curriculum, lesson, or assessment; and
      a plurality of value pairs defining:
         an intended audience for the learning objective content,
         a skill to be taught and assessed in association with the learning objective content; and
         a learning scale score or range of scores measuring a proficiency associated with the skill, and indicating a stage at which a learning objective should be understood by a learner;
   automatically convert the plurality of data pairs into at least one database record;
   store the learning objective content within a repository of electronic content in association with the at least one database record;
   generate an index, creating a map within the network to the learning objective content, the value pairs, and at least one data dictionary comprising at least one additional resource associated with the learning objective content;
   receive, from a second GUI on a second client device, a second user input comprising a request including a selection matching the intended audience, the skill, and the learning scale score or range
   identify a client application from which the request was received;
   generate a Remote Procedure Call (RPC) customized to the client application;
   route the RPC as a request to an Application Programming Interface (API);
   execute, by the API according to the index, a database command:
      selecting the learning objective content from the database, ranked
         according to the learning scale score or range; and
         accessing the data dictionary; and
   render, on the second GUI, a user interface control comprising at least one quick response (QR) code storing:
      at least one list item including a link to access the learning objective content; and
      at least one instruction for recreating the request; and
an application programming interface (API) executing the instructions.

4. The system of claim 3, wherein an objective, a grammar point, or a vocabulary item are stored as at least one data record in the database.

5. The system of claim 4, wherein the at least one data record is indexed for mapping:
the client application to the RPC; and
the request from the client application to the database.

6. The system of claim 4, wherein the at least one data record is inserted into the database from the plurality of value pairs comprising an extensible markup language (XML) file, a JavaScript Object Notation (JSON) object or a comma-delimited text file:
   input by a data entry user and confirmed by a second data entry user; or
   generated from a data extraction during a web crawl, using artificial intelligence according to input from the data entry user and the second data entry user.

7. The system of claim 3, wherein at least one parameter for configuring the RPC is stored within a mapping database.

8. The system of claim 7, wherein the mapping database includes at least one data record mapping a plurality of client applications to at least one database utilized by each of the plurality of the client applications.

9. The system of claim 3, wherein the at least one list item comprises an objective, at least one skill associated with the objective, and a score within a range of language competency scores.

10. The system of claim 3, wherein the at least one list item comprises a grammar point and a score within a range of language competency scores.

11. The system of claim 3, wherein the at least one list item comprises a vocabulary item, a context in which the vocabulary item is used, a part of speech associated with the vocabulary item, and a score within a range of language competency scores.

12. A method comprising the steps of:
receiving, by a server comprising a computing device coupled to a network and including at least one processor executing instructions within a memory, from a first Graphical User Interface (GUI) on a first client device, a first user input, comprising:
a learning objective content; and
a plurality of value pairs defining:
   an intended audience for the learning objective content;
   a skill to be taught and assessed in association with the learning objective content;

a learning scale score or range of scores measuring a proficiency associated with the skill, and indicating a stage at which a learning objective should be understood by a learner;

automatically converting, by the server, the plurality of data pairs into at least one database record;

storing, by the server, the learning objective content within a repository of electronic content in association with the at least one database record;

generating, by the server, an index, creating a map within the network to the learning objective content, the value pairs, and at least one data dictionary comprising at least one additional resource associated with the learning objective content;

receiving, by the server, from a second GUI on a second client device, a second user input comprising a request including a selection matching the intended audience, the skill, and the learning scale score or range identifying, by the server, a client application from which the request was received;

generating, by the server, a Remote Procedure Call (RPC) customized to the client application;

routing, by the server, the RPC as a request to an Application Programming Interface (API);

executing, by the API according to the index, a database command:
  selecting the learning objective content from the database, ranked according to the learning scale score or range; and
  accessing the data dictionary; and rendering, by the server on the second GUI, a user interface control comprising at least one quick response (QR) code storing:
  at least one list item including a link to access the learning objective content; and
  at least one instruction for recreating the request.

13. The method of claim 12, further comprising the step of storing, by the server, an objective, a grammar point, or a vocabulary item as at least one data record in the database.

14. The method of claim 13, further comprising the step of indexing, by the server, the least one data record for mapping:
  the client application to the RPC; and
  the request from the client application to the database.

15. The method of claim 13, further comprising the step of inserting, by the server, the at least one data record into the database from the plurality of value pairs comprising an extensible markup language (XML) file, a JavaScript Object Notation (JSON) object, or a comma-delimited text file:
  input by a data entry user and confirmed by a second data entry user; or
  generated from a data extraction during a web crawl, using artificial intelligence according to input from the data entry user and the second data entry user.

16. The method of claim 12, further comprising the step of storing, by the server, within a mapping database, at least one parameter for configuring the RPC.

17. The method of claim 16, wherein the mapping database includes at least one data record mapping a plurality of client applications to at least one database utilized by each of the plurality of the client applications.

18. The method of claim 12, wherein the at least one list item comprises an objective, at least one skill associated with the objective, and a score within the range of language competency scores.

19. The method of claim 12, wherein the at least one list item comprises a grammar point and a score within a range of language competency scores.

20. The method of claim 12, wherein the at least one list item comprises a vocabulary item, a context in which the vocabulary item is used, a part of speech associated with the vocabulary item, and a score within a range of language competency scores.

* * * * *